US012768506B1

(12) United States Patent
Xiang

(10) Patent No.: US 12,768,506 B1
(45) Date of Patent: Oct. 20, 2026

(54) DECORATIVE LIGHT STRING WITH LAMP SHELL

(71) Applicant: Hongqiong Xiang, Hunan (CN)

(72) Inventor: Hongqiong Xiang, Hunan (CN)

( * ) Notice: Subject to any disclaimer, the term of this patent is extended or adjusted under 35 U.S.C. 154(b) by 0 days.

(21) Appl. No.: 19/436,941

(22) Filed: Dec. 30, 2025

(51) Int. Cl.
*F21S 4/10* (2016.01)
*F21V 17/16* (2006.01)
*F21V 23/00* (2015.01)

(52) U.S. Cl.
CPC .............. *F21S 4/10* (2016.01); *F21V 17/162* (2013.01); *F21V 23/002* (2013.01)

(58) Field of Classification Search
CPC ........ F21S 4/10; F21V 17/162; F21V 23/002; F21V 19/001; F21V 19/0015; F21V 19/0025; F21V 3/049; A44C 15/0015
See application file for complete search history.

(56) References Cited

U.S. PATENT DOCUMENTS 5,361,192 A * 11/1994 Lai ............................ F21S 4/10 362/249.06
5,414,605 A * 5/1995 Lin ......................... F21V 31/00 362/267
5,517,394 A * 5/1996 Lin ........................... F21S 4/10 362/311.06
8,070,347 B1 * 12/2011 Lin ........................... F21S 4/10 362/656
10,845,012 B1 * 11/2020 Chung ....................... F21V 3/02
11,506,362 B1 * 11/2022 Wang ......................... F21S 4/10
2009/0318027 A1 * 12/2009 Tseng ......................... F21S 4/10 439/619
2011/0050081 A1 * 3/2011 Lin ........................ F21V 21/002 313/318.01
2015/0103524 A1 * 4/2015 McRae ...................... F21S 4/10 362/249.02
2015/0211727 A1 * 7/2015 Loomis ...................... F21V 3/02 362/375
2024/0084994 A1 * 3/2024 Li .......................... F21V 21/088

FOREIGN PATENT DOCUMENTS

CA 2655464 A1 * 8/2010 .......... F21V 19/0015
CN 216345604 U * 4/2022

OTHER PUBLICATIONS

"Blowata Christmas Necklace, 1Pcs Light up Christmas Accessories with 9 Bulbs, Colorful 3 Glow Modes Light Xmas Necklaces, Ugly Sweater Costumes Accessories for Xmas Party Favor Festival Supplies" (Amazon. com) Published Jul. 13, 2025. Obtained from the URL:<https://www.amazon.com/dp/B0FGV44SY6>. Downloaded on Jan. 12, 2026.

* cited by examiner

*Primary Examiner* — Erin Kryukova
(74) *Attorney, Agent, or Firm* — Hawaii Patent Services; Nathaniel K. Fedde; Kenton N. Fedde

(57) ABSTRACT

The present disclosure relates to a decorative light string with a lamp shell, where a lamp bead is directly electrically connected to the wire and reliably secured using a fastening plug, simplifying the installation process of traditional light strings, avoiding the use of complex additional tools, and improving installation efficiency and safety. The lamp shell consists of a lamp body and a lamp cover, achieving a stable connection through the collaboration of a limiting structure and the fastening plug. Meanwhile, the fixed design of the lamp beads prevents loosening caused by vibration or stretching, significantly enhancing the stability and service life of the light string.

9 Claims, 10 Drawing Sheets

DECORATIVE LIGHT STRING WITH LAMP SHELL

TECHNICAL FIELD

The present disclosure relates to the technical field of decorative lights, particularly to a decorative light string with a lamp shell.

BACKGROUND

In traditional light string designs, lamp beads are typically connected to the wire indirectly through a lamp board. A common connection method involves: first cutting the wire, then soldering the lamp bead or lamp board between the two cut ends. This process is highly prone to cold soldering, which not only results in poor reliability but also carries risks of poor contact, loosening, or short circuits. Especially during long-term use, factors such as environmental vibration, temperature changes, and material fatigue can easily cause lamp beads to detach or electrical connections to fail, posing certain safety hazards. Weak solder joints may completely break under external force or after prolonged connection, causing small components like lamp beads to detach from the light string. If these detached small parts are mistakenly picked up and swallowed by children, they pose a serious health and safety risk. Additionally, existing lamp bead assembly methods often rely on structural connections such as threaded fastening or snap-fit splicing. These methods are usually complex and require specialized tools, leading to cumbersome installation processes, low efficiency, and higher skill requirements for operators.

For example, in existing U.S. Pat. No. 10,064,461B2, lamp beads are secured using snap-fit structures and a lamp shell. While this addresses the assembly issue between the lamp bead and the lamp shell, it still relies on external snap-fits and structural connections, failing to effectively prevent lamp bead loosening caused by external connector slack or environmental factors. Moreover, in this technical solution, lamp bead installation still requires structural connectors, and the complex assembly process results in overall low installation efficiency.

SUMMARY

The present disclosure provides a decorative light string with a lamp shell to address the issues raised in the above background art.

To achieve the above inventive object, the present disclosure adopts the following technical solution:

A decorative light string with a lamp shell includes at least one segment of continuous uninterrupted wire; a lamp bead, a positive terminal and a negative terminal of the lamp bead being directly electrically connected to a segment of the continuous wire to form a lamp bead connection section; the lamp shell, including a lamp body and a lamp cover, the lamp body forming an interior cavity for accommodating the lamp bead, the lamp cover being disposed on a top of the lamp body and provided with a through hole, the segment of the wire of the lamp bead passing through the through hole and extending into the interior cavity, wherein the lamp shell further includes a light-transmitting part, with a light-emitting surface of the lamp bead facing the light-transmitting part of the lamp shell, allowing light emitted by the lamp bead to evenly disperse through the light-transmitting part; and a fastening plug inserted into the through hole of the lamp cover, securing the lamp bead connection section against an inner wall of the through hole through compression.

The fastening plug has a conical structure that gradually expands axially from a small end to a large end, configured to be inserted into the through hole from one side of the lamp cover after the lamp bead connection section is threaded through the through hole, and to exert a radial compressive force on the lamp bead connection section through cooperation between an outer peripheral surface thereof and the inner wall of the through hole, thereby fixing the lamp bead connection section within the through hole of the lamp cover.

The beneficial effects of the present disclosure compared to the prior art are as follows:

Compared to traditional light string designs, the installation process of the light string in this embodiment is significantly simplified. Users can secure a light point in just three steps: first bend the lamp bead connection section with the lamp bead, then thread it through the through hole from the top of the lamp cover, and finally insert the fastening plug into the through hole from the bottom of the lamp cover and press it tight. The entire process requires no threaded fastening or snap-fit assembly, nor any specialized tools, greatly reducing the skill requirements for operators and operational complexity. This intuitive and rapid assembly method not only shortens the installation time per node but also makes large-scale construction or DIY home installation feasible, thereby substantially improving overall installation efficiency.

BRIEF DESCRIPTION OF DRAWINGS

The drawings, which form a part of this application, are provided to further illustrate the present disclosure. The illustrative embodiments and the descriptions thereof are used to explain the present disclosure and do not constitute an improper limitation thereof. In the drawings.

REFERENCE SIGNS

Figure 1:
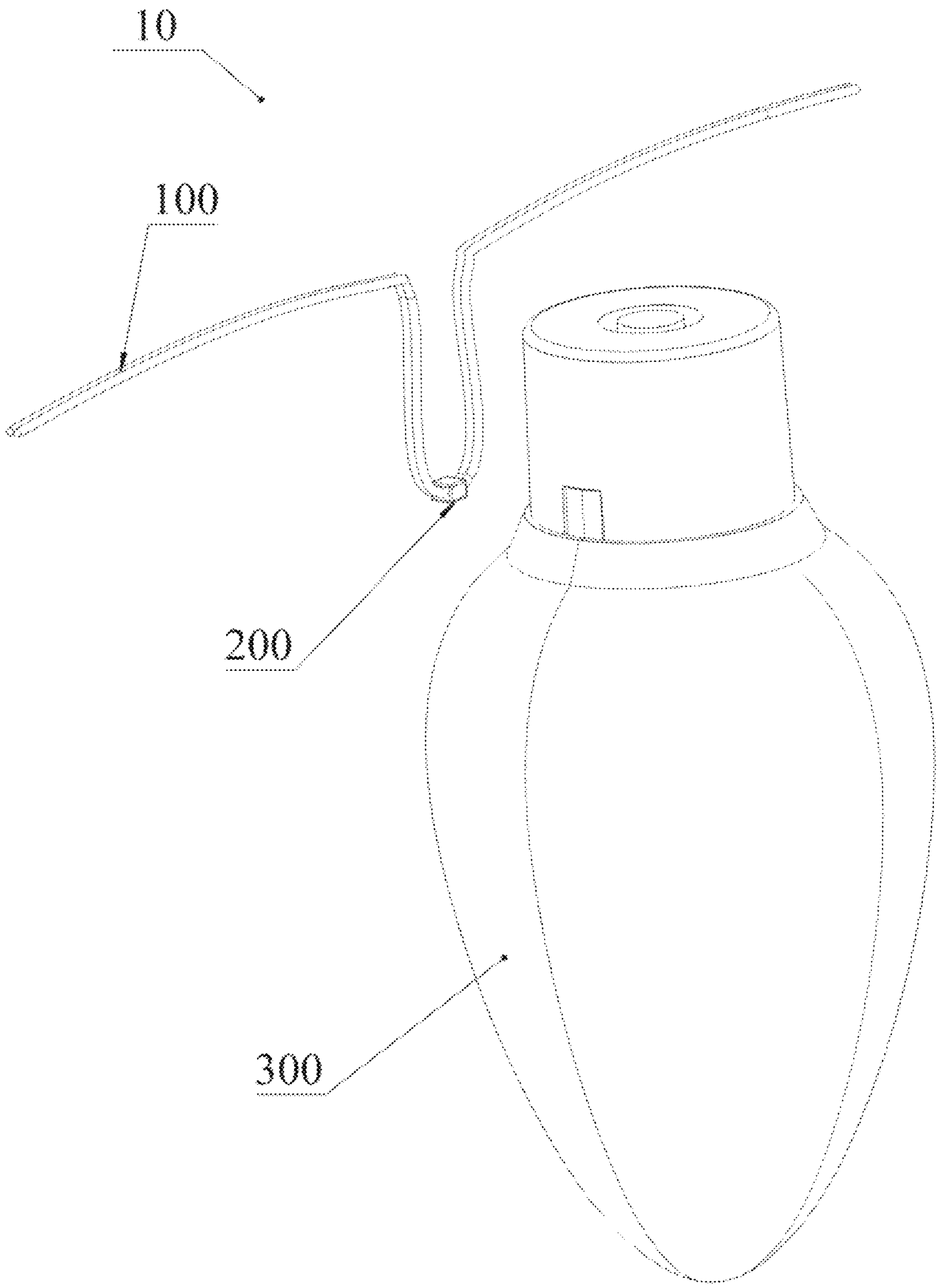
FIG. 1 is a perspective schematic diagram of an embodiment provided by the present disclosure.

Light String (10); Wire (100); Lamp Bead Connection Section (**100*a*); First Wire Segment (110); Second Wire Segment (120); Lamp Bead (200); Lamp Shell (300); Lamp Body (310); Mounting Connector (311); Limiting Rib (3111); Upper Casing (312); Connecting Flange (3121**);

Lower Casing (313); Recess (3131); Positioning Protrusion (314); Interior Cavity (315); Optical Texture (316); Lamp Cover (320); Through Hole (321); Positioning Groove (322); Light-Transmitting Part (340); Fastening Plug (400); First End (410); Second End (420).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, equipment, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

In the present disclosure, addressing the technical problems of traditional light strings where lamp beads are mostly indirectly connected to the wire through a lamp board, easily leading to short-circuit risks and safety hazards, and where lamp bead assembly commonly relies on complex structural connection methods such as threaded fastening or snap-fit splicing, requiring special tools, cumbersome operations, and low installation efficiency, a decorative light string with a lamp shell is provided. It includes a wire, lamp beads, a lamp shell, and its lamp body, lamp cover, and fastening plug in a coordinated structure. This light string achieves the technical effect of reliable fixation of the lamp bead connection section by having the lamp beads directly electrically connected to the wire, bent and passed through the through hole of the lamp cover, and secured by inserting and compressing with the fastening plug, without the need for additional tools. This effectively solves the technical defects of existing light strings, such as prone loosening, complex installation, low efficiency, and insufficient safety. The specific implementation of the decorative light string with a lamp shell of the present disclosure is described in detail below with reference to the accompanying drawings.

As shown in FIGS. 1, 2, 3, and 5, the present disclosure provides a decorative light string 10 with a lamp shell, including a wire 100, a lamp bead 200, a lamp shell 300 and a fastening plug 400. The lamp bead 200 is directly mounted on the wire 100, and the lamp shell 300 consists of a lamp body 310 and a lamp cover 320. The lamp body 310 internally forms an interior cavity 315 for accommodating the lamp bead 200. A through hole 321 is formed at the center of the lamp cover 320, and this through hole 321 communicates with the interior cavity 315 of the lamp body 310. After bending the lamp bead connection section 100*a* of the wire 100 where the lamp bead 200 is mounted, it passes through the through hole 321 from the top surface of the lamp cover 320 and extends into the interior cavity 315, thereby positioning the lamp bead 200 within the interior cavity 315.

Figure 2:
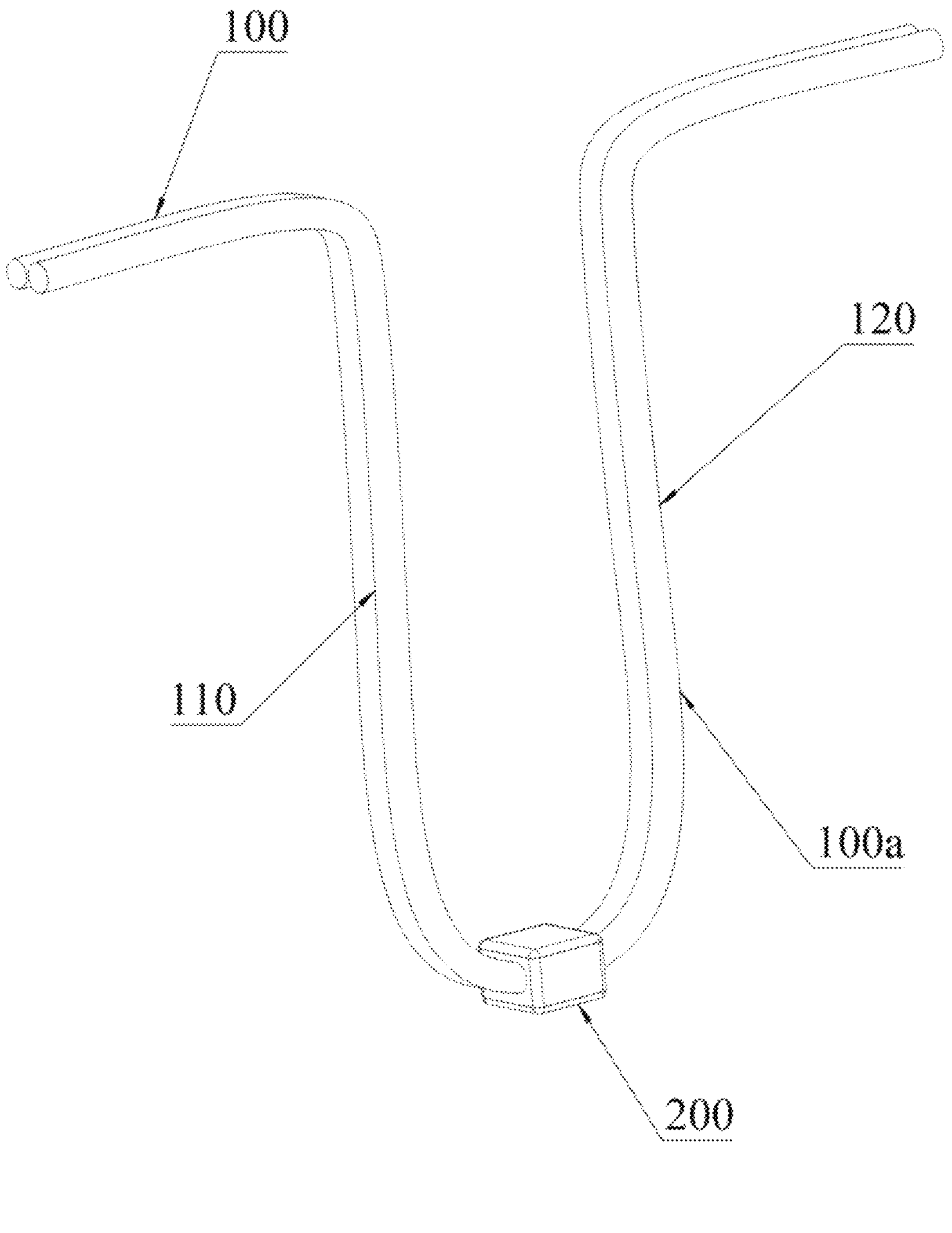
FIG. 2 is a connection schematic diagram of the wire and lamp bead in the embodiment of FIG. 1.
Figure 3:
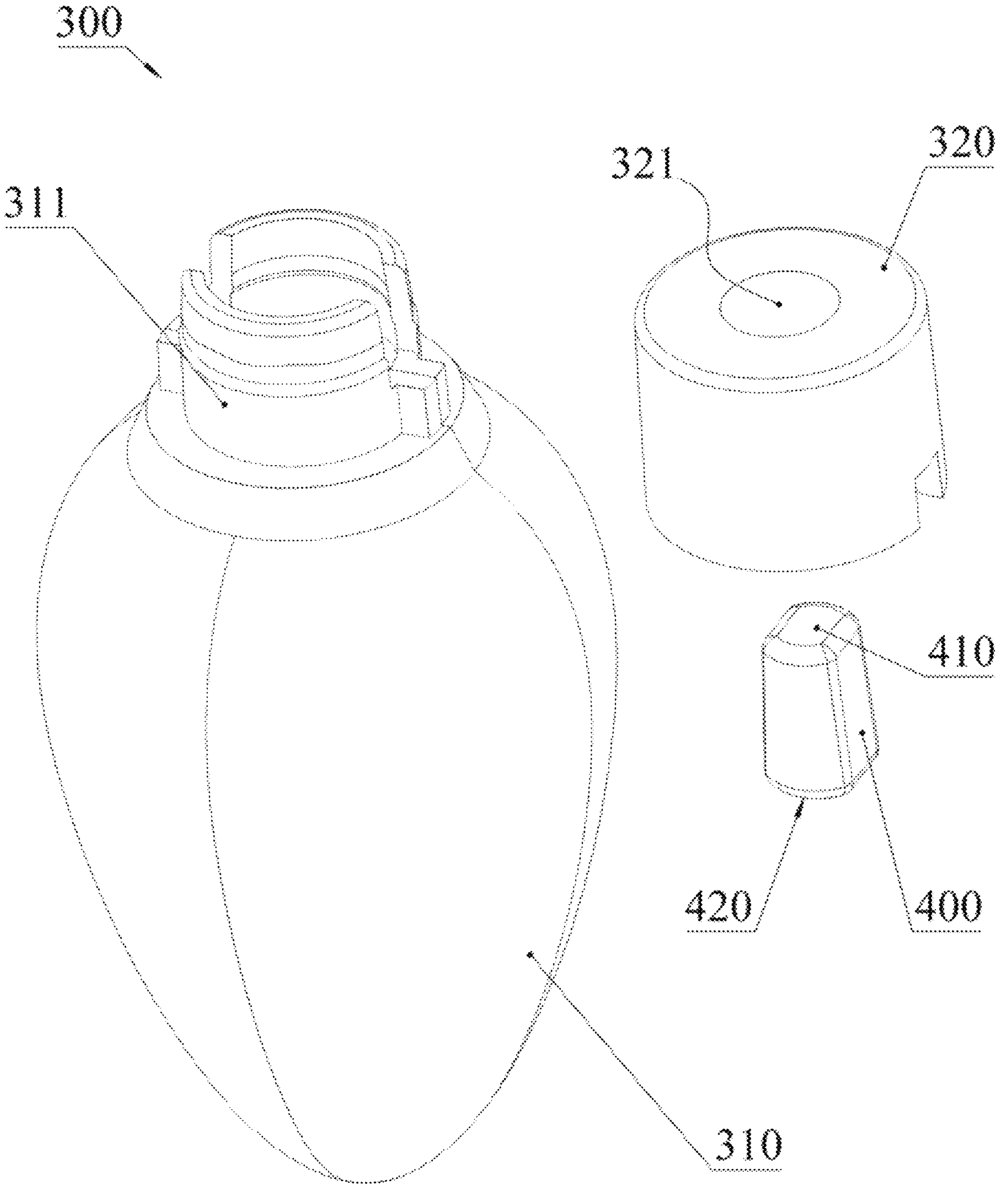
FIG. 3 is an exploded schematic diagram of the lamp shell in the embodiment shown in FIG. 1.

As shown in FIGS. 2 and 3, a lamp bead 200 with an outwardly protruding raised structure is installed on the wire 100, and the position of the lamp bead 200 forms a lamp bead connection section 100*a*. Specifically, the lamp bead 200 is not indirectly mounted to the wire through any lamp board or extension component; instead, the lamp bead 200 is directly electrically connected to the wire 100 at the connection point, which is the lamp bead connection section 100*a*. The lamp bead connection section 100*a* is inserted from the top of the lamp cover 320 and passes through the through hole 321 of the lamp cover 320. The through hole 321 communicates with the lamp body 310, allowing the lamp bead connection section 100*a* with the lamp bead 200 to be accommodated within the through hole 321, with the lamp bead 200 itself accommodated and positioned inside the lamp body 310. A fastening plug 400 is used to secure the lamp bead connection section 100*a*. The fastening plug 400 is inserted into the through hole 321 from the bottom surface of the lamp cover 320, thereby compressing and fixing the lamp bead connection section 100*a* against the inner wall of the through hole 321. In this embodiment, the wire 100 is a continuous, uninterrupted wire segment whose insulation layer is removed at preset locations to expose the internal metal conductor. The positive terminal of the lamp bead 200 is directly attached and electrically connected to one side of the exposed conductor through conductive adhesive material, while its negative terminal is directly attached and electrically connected to the other side of the exposed conductor. Based on this connection relationship, the wire 100 is divided at the lamp bead connection section 100*a* into a first wire segment 110 and a second wire segment 120. Here, the first wire segment 110 refers to the portion of the wire located on the positive terminal side of the lamp bead 200 and extending away from the negative terminal of the lamp bead 200, while the second wire segment 120 refers to the portion located on the negative terminal side of the lamp bead 200 and extending away from the positive terminal of the lamp bead 200. The metal conductor of the wire 100 itself maintains both physical and electrical continuity at the connection point of the lamp bead 200. This direct attachment method of the lamp bead 200 to the wire 100 avoids the traditional process of cutting the wire and performing soldering, not only simplifying the assembly procedure but also fundamentally eliminating the risks of cold solder joints and solder point detachment, thereby significantly enhancing the long-term reliability and safety of the electrical connection. The lamp bead connection section 100*a* is bent and passes through the through hole 321 of the lamp cover 320, exposing the lamp bead 200 at the bottom surface of the lamp cover 320. This design not only simplifies the installation steps for the lamp bead 200 and the wire 100 but also improves installation efficiency. The fastening plug 400 is inserted into the through hole 321 to secure the lamp bead connection section 100*a*, making it less prone to detachment and preventing loosening or short circuits caused by prolonged use. The fixation of the lamp bead connection section 100*a* within the through hole 321 stabilizes the position of the lamp bead 200, further enhancing safety and reliability in use.

In the present disclosure, the lamp bead 200 is powered by a power source, such as one or more batteries, which may be integrated inside the control assembly or set up independently. The control assembly may include a switch and circuitry to achieve various lighting functions, such as on-off, rapid flashing, and/or slow flashing modes. The lamp bead 200 is preferably a light-emitting diode (LED) or other low-heat-emitting element, combined with the aforementioned power supply and control structure, enabling the decorative light string to be suitable for various scenarios like wearing and indoor decoration, without worrying about safety hazards caused by heat from the lamp bead. Meanwhile, the lighting effects can be flexibly regulated through the control assembly, enhancing decorative practicality. The wire 100 is preferably made of high-temperature-resistant and anti-aging materials, such as heat-resistant silicone-coated copper wire, or low-impedance silver-plated wire, to reduce current loss and extend the service life of the light string.

Figure 10:
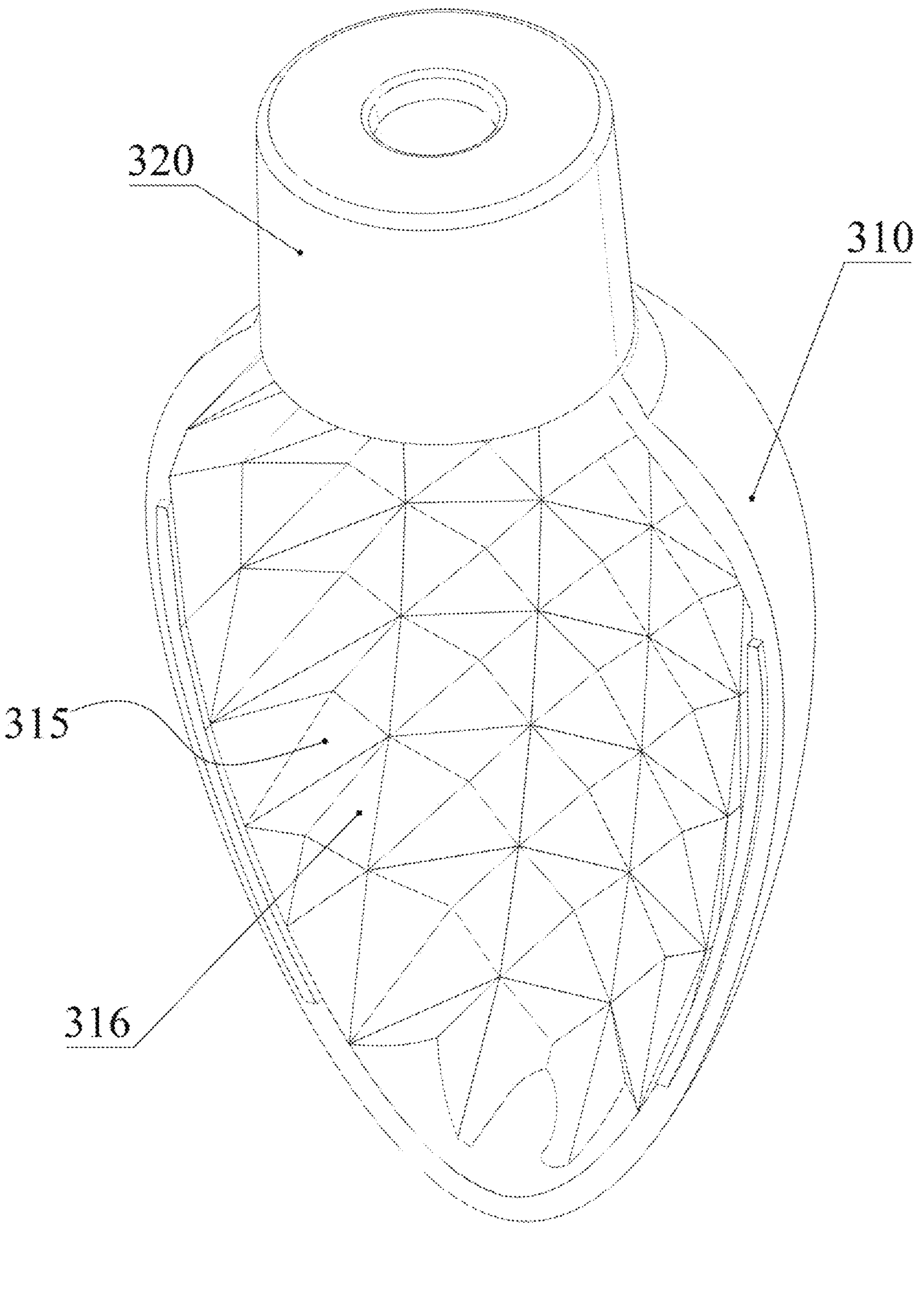
FIG. 10 is a structural schematic diagram of the interior of the lamp body in the embodiment shown in FIG. 1.

In a preferred embodiment of the present disclosure, the lamp shell 300 mainly includes a lamp body 310 and a lamp cover 320. The exterior of the lamp body 310 features decorative designs, and suitable shapes and materials can be selected according to specific application scenarios, such as plastic, transparent, or translucent materials, so that when the lamp bead 200 emits light, the light can pass through the lamp body 310 to form a good decorative effect. To further optimize the lighting effect and enhance decorativeness, referring to FIG. 10, the wall of the interior cavity 315 of the lamp body 310 is provided with an optical texture 316. This optical texture 316 may be regular or irregular bump arrays, micro-prism arrays, frosted surfaces, or coating layers, etc. Its function is to reflect and/or diffuse the direct light emitted by the lamp bead 200, making the light distribution more uniform and soft when viewed from outside the lamp shell 300, capable of forming halos or special pattern effects. This effectively avoids the glare of point light sources and significantly enhances the overall aesthetic appeal and visual comfort of the decorative light string.

In other embodiments of the present disclosure, in addition to traditional switch and flashing mode controls, more precise brightness adjustment functions can be further provided. For example, the light string can be configured with multiple brightness levels or adopt stepless dimming technology, allowing users to achieve gradual brightness adjustment of the lamp beads through rotary switches or remote control. This function is particularly suitable for environments requiring different lighting intensities, such as homes, offices, or outdoor gathering places.

Figure 5:
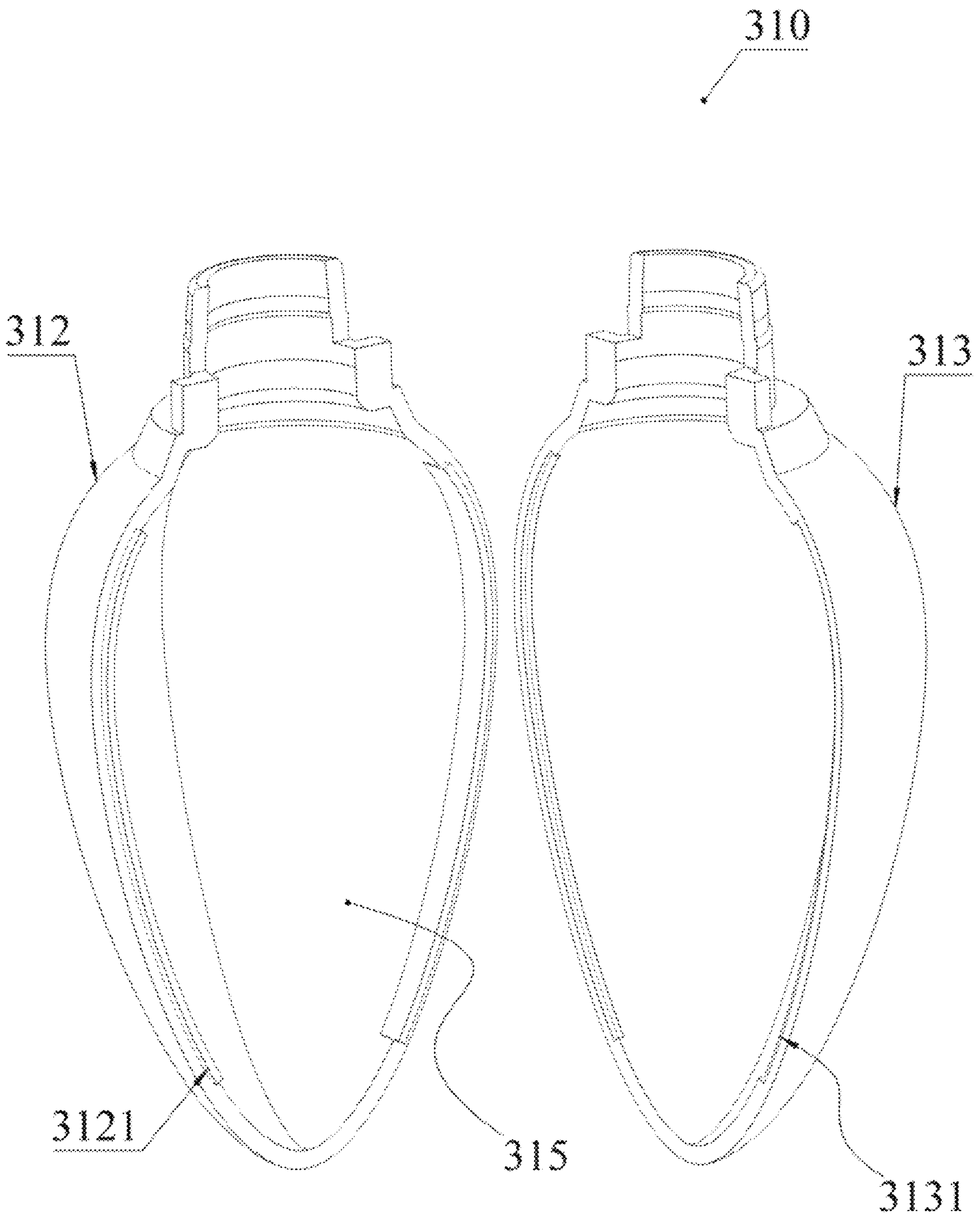
FIG. 5 is an exploded schematic diagram of the lamp body in the embodiment shown in FIG. 4.

As shown in FIG. 5, the lamp body 310 of the lamp shell 300 preferably includes an upper casing 312 and a lower casing 313. The upper casing 312 and the lower casing 313 are connected through a connecting edge. Specifically, the connecting edge of the upper casing 312 relative to the lower casing 313 is provided with a connecting flange 3121, while correspondingly, the connecting edge of the lower casing 313 relative to the upper casing 312 is provided with a recess 3131. The connecting flange 3121 and the recess 3131 are adapted to snap together, enabling the upper casing 312 to be securely connected to the lower casing 313, thereby forming a stable integrated structure. During installation, the upper casing 312 and the lower casing 313 are assembled into the lamp shell 300 through the engagement of the connecting flange 3121 and the recess 3131. This connection method ensures firm fixation between the two parts and prevents loosening due to vibration or external forces. The mating design of the upper casing 312 and the lower casing 313 not only enhances the stability of the lamp shell but also simplifies the assembly process, avoiding issues associated with traditional assembly methods that use screws or complex connectors.

Figure 4:
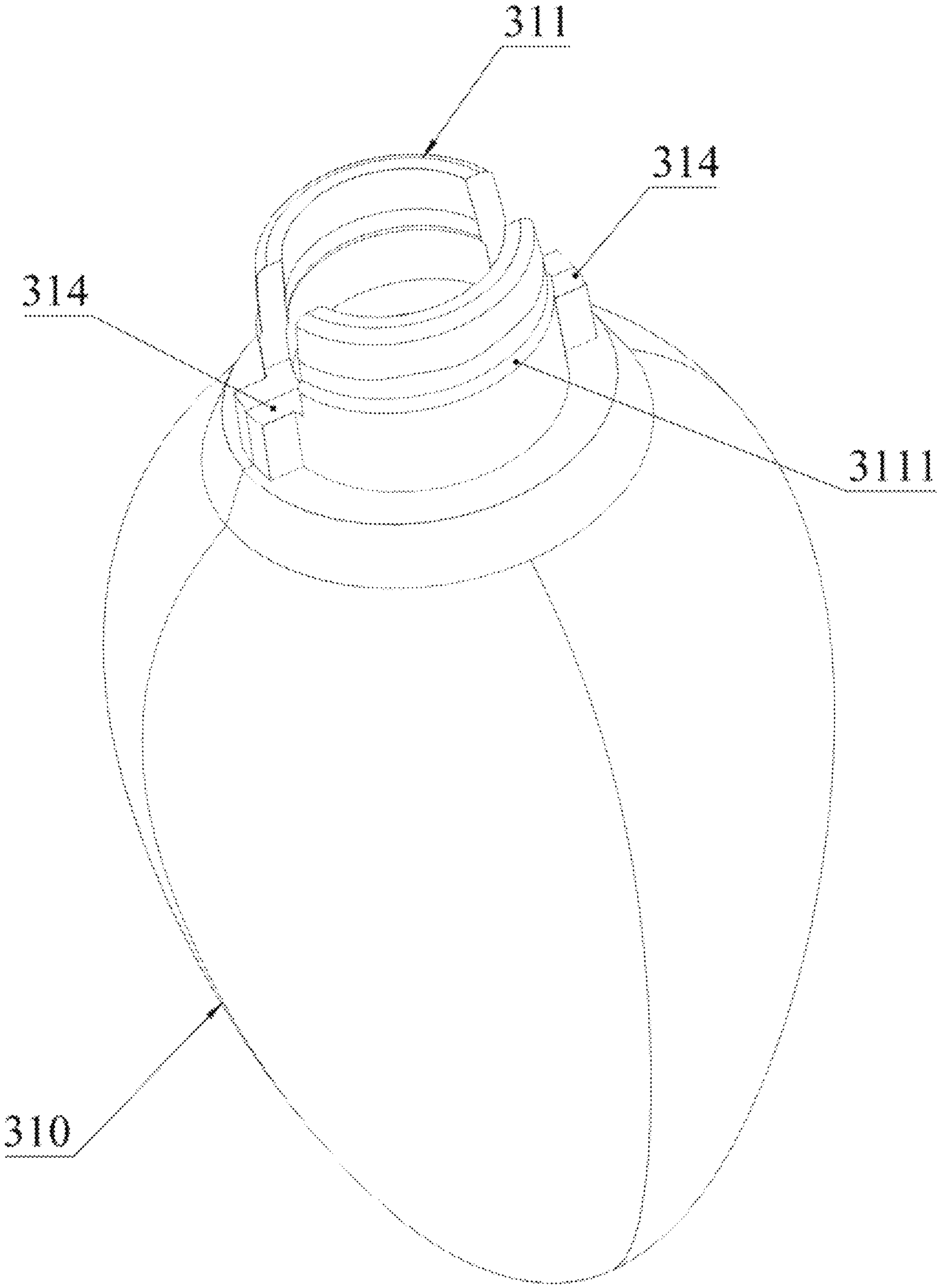
FIG. 4 is a perspective schematic diagram of the lamp body in the embodiment shown in FIG. 1.
Figure 6:
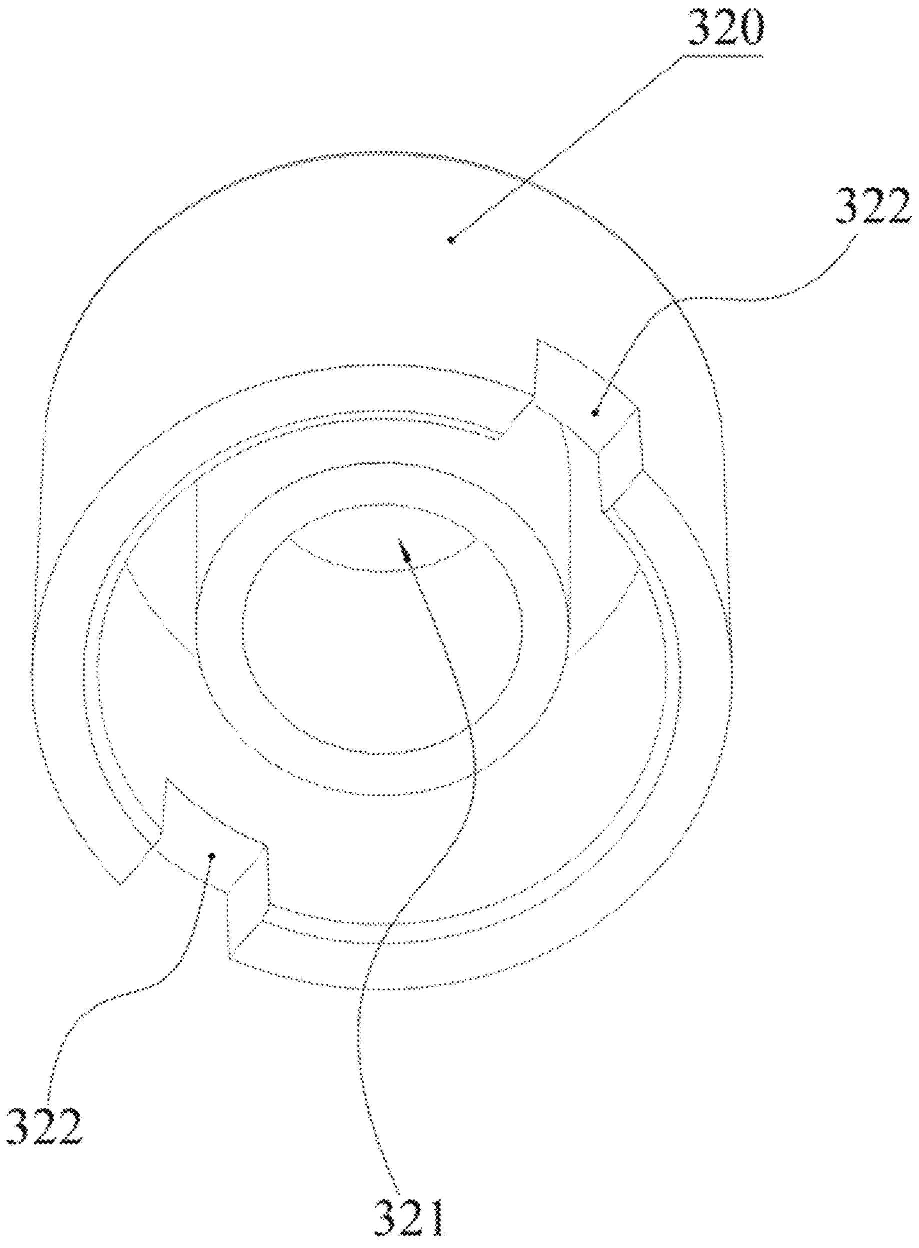
FIG. 6 is a perspective schematic diagram of the lamp cover in the embodiment shown in FIG. 3.
Figure 8:
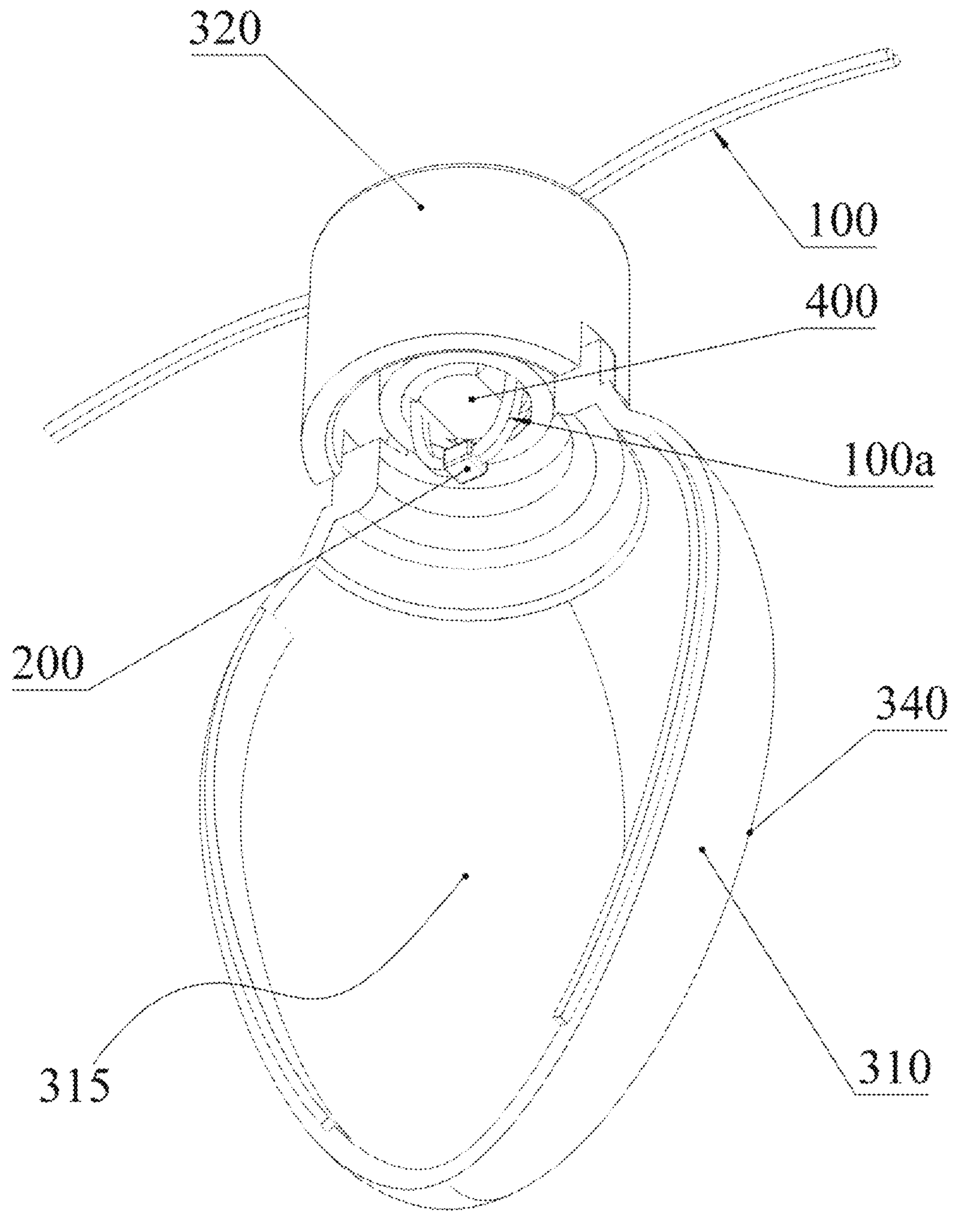
FIG. 8 is an installation schematic diagram of the wire, lamp bead, and lamp shell in the embodiment shown in FIG. 1.

As shown in FIGS. 4, 6, and 8, the top end of the lamp body 310 forms a protruding mounting connector 311, and the outer side wall of this mounting connector 311 is provided with an integrally formed limiting rib 3111. The lamp cover 320 is fixed onto the mounting connector 311 of the lamp body 310 by nesting. During installation, the inner wall of the lamp cover 320 contacts and abuts against the limiting rib 3111; the presence of the limiting rib 3111 ensures a stable and reliable connection between the lamp cover 320 and the lamp body 310, preventing loosening over prolonged use. When the top of the lamp cover 320 aligns with the mounting connector 311 of the lamp body 310, the limiting rib 3111 precisely contacts the inner wall of the lamp cover 320 and provides support, achieving a secure fixation. This connection method not only simplifies the assembly process but also enhances the overall stability of the product, avoiding potential failures caused by complex connection structures. Preferably, both the mounting connector 311 and the lamp cover 320 are designed in a cylindrical shape, further improving structural stability and alignment accuracy.

It should be noted that during the installation of the lamp bead connection section 100*a*, the light-emitting surface of the lamp bead 200 should face the light-transmitting part 340 of the lamp shell 300, rather than the direction of the through hole 321. This light-transmitting part 340 refers to the area in the lamp shell 300 that allows light to pass through, i.e., the portion of the lamp body 310 excluding the mounting connector 311, typically made of transparent or translucent material. For example, the lamp body 310 of the lamp shell 300 can be made of transparent or translucent plastic, so that when the lamp bead 200 is lit, the light can evenly diffuse outward through the light-transmitting part of the lamp shell. Specifically, during installation, the light-emitting surface of the lamp bead 200 should align with the inner surface of the light-transmitting part 340 to ensure that the light emitted by the lamp bead 200 is dispersed through the light-transmitting part 340 without being blocked by other components. The light from the lamp bead 200 undergoes soft diffusion through the light-transmitting part 340, thereby enhancing the decorative effect of the light string, improving overall aesthetics, and enhancing the uniformity of illumination.

Please continue to refer to FIGS. 4, 6, and 8. The lamp body 310 further includes a positioning protrusion 314 located at the bottom of the mounting connector 311, and the lamp cover 320 correspondingly has a positioning groove 322. When the lamp cover 320 is installed onto the lamp body 310, the positioning protrusion 314 can precisely fit into the positioning groove 322, restricting unintended radial movement of the lamp cover 320 after installation. This ensures accurate alignment and a secure connection between the lamp cover 320 and the lamp body 310. The design of the positioning protrusion 314 and positioning groove 322 allows the lamp cover 320 to nest stably onto the lamp body 310, thereby preventing displacement or loosening of the lamp cover 320 due to external forces during use. This structure not only improves connection stability but also simplifies the assembly process, making the overall assembly of the lamp shell 300 more convenient and efficient.

Figure 7:
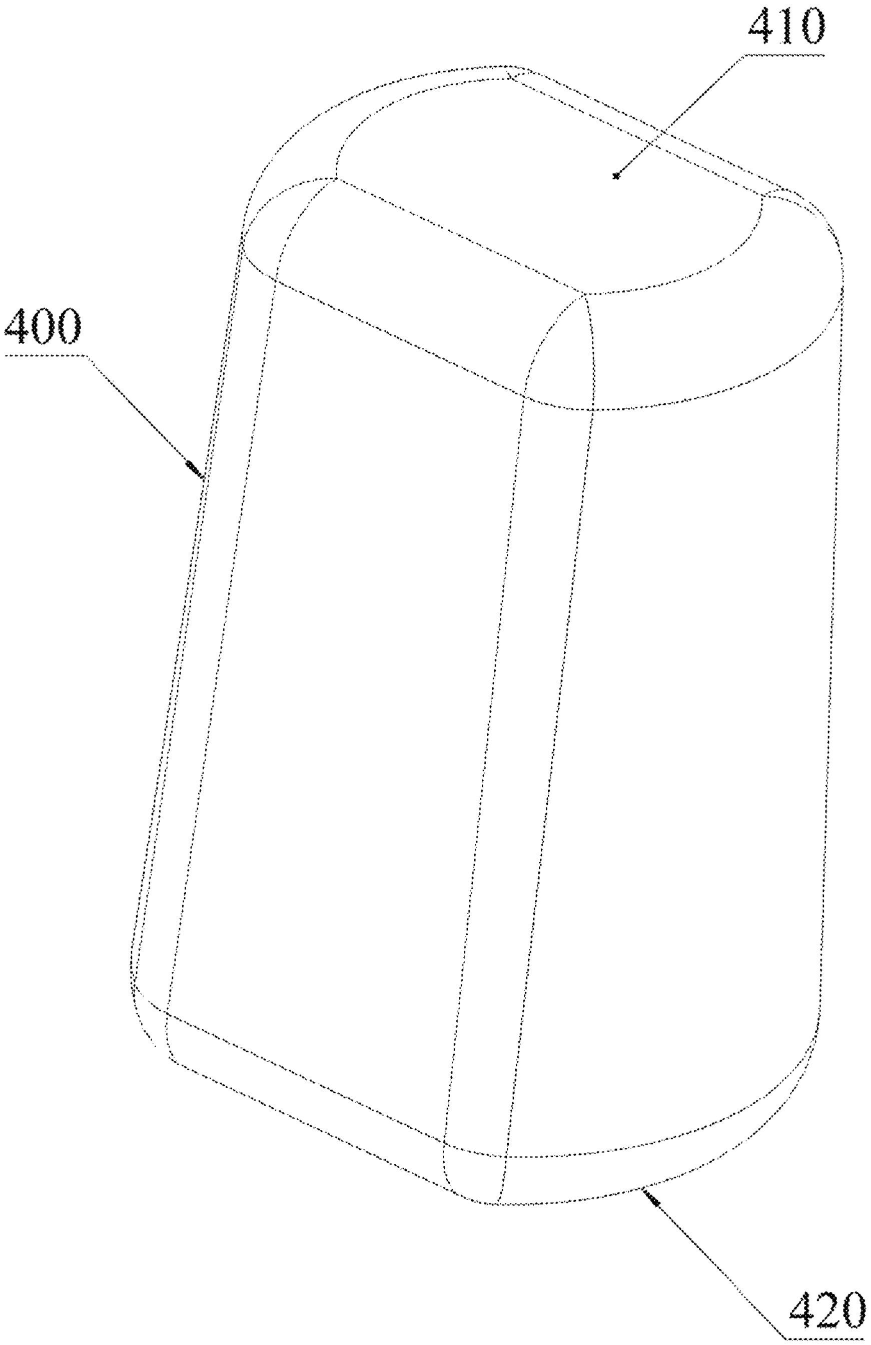
FIG. 7 is a perspective schematic diagram of the fastening plug in the embodiment shown in FIG. 3.
Figure 9:
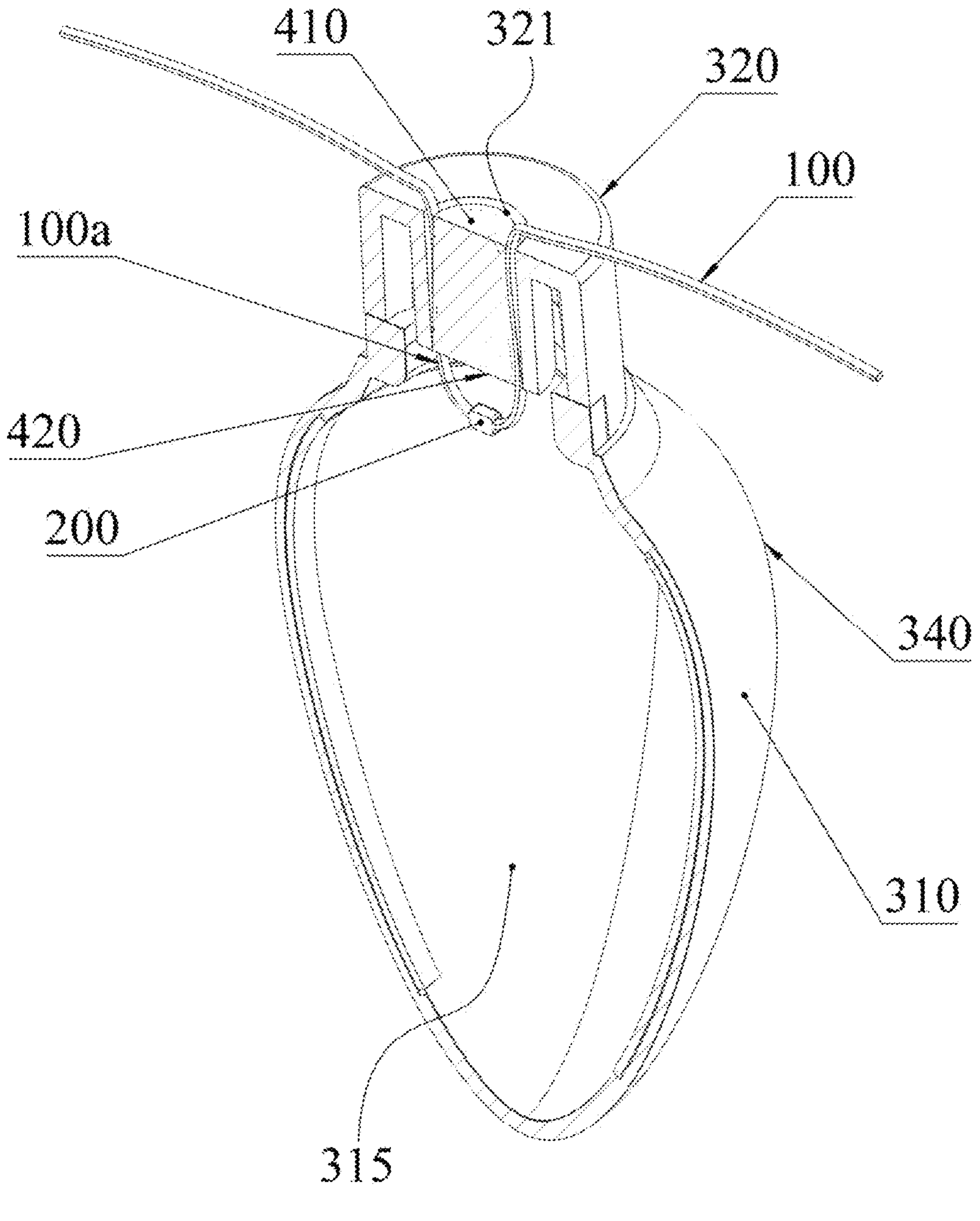
FIG. 9 is a cross-sectional view of the embodiment shown in FIG. 8.

As shown in FIGS. 7 and 9, the fastening plug 400 is preferably a flat truncated conical structure, with a first end 410 and a second end 420 arranged opposite each other. Both the upper and lower base surfaces are roughly elliptical, the side surfaces form a gentle truncated cone, and the overall shape is a flat platform that is smaller at the top and larger at the bottom. This flat platform structure design naturally creates a gap between the fastening plug 400 and the inner wall of the through hole 321, which accommodates the layout of the lamp bead connection section 100*a*. This allows the side-wall surface of the fastening plug 400 to effectively provide clearance for the lamp bead connection section 100*a*, avoiding compression damage to it, while also reserving reasonable space for subsequent radial compression fixation. Here, the contour size of the first end 410 is smaller than that of the second end 420, giving the outer peripheral surface of the fastening plug 400 a gradually expanding flat conical shape. During assembly, the fastening plug 400 is inserted into the through hole 321 from the bottom surface of the lamp cover 320 through its smaller first end 410. As the fastening plug 400 gradually advances into the through hole 321, the gap between its expanding flat conical outer peripheral surface and the inner wall of the through hole 321 narrows progressively, thereby applying a continuously increasing radial compressive force to the lamp bead connection section 100*a* passing through this gap. Simultaneously, the fastening plug 400 is made of an elastic material, and its flat conical structure undergoes adaptive elastic deformation during insertion into the through hole 321. On one hand, this further increases the contact area and friction with the inner wall surface of the through hole 321, enhancing the stability of its installation; on the other hand, it also buffers the pressure on the lamp bead connection section 100*a* through deformation, preventing damage to the wire and achieving flexible fixation. The synergistic effect of this radial compressive force and elastic deformation forces the lamp bead connection section 100*a* to be tightly pressed against the inner wall of the through hole 321, achieving reliable locking through friction. This structural design not only accommodates the layout form of the lamp bead connection section but also ensures that the lamp bead connection section 100*a* is securely clamped and fixed within the through hole 321, effectively preventing axial displacement or loosening.

Furthermore, the axial height of the fastening plug 400 is not greater than the depth of the through hole. This dimensional relationship ensures that when the fastening plug 400 completes the compressive fixation of the lamp bead connection section 100*a* and is installed in place, its top, i.e., the first end 410, does not protrude beyond the outer top surface of the lamp cover 320, thereby maintaining the smooth and complete appearance of the top of the lamp shell 300. This avoids potential risks of impact or snagging during use, enhancing the product's safety and aesthetics. Simultaneously, the maximum dimension of the end face at the second end of the fastening plug 400 is set to be greater than or equal to the opening diameter of the through hole 321. This design creates an effective physical stop during the assembly of the light string: when the fastening plug 400 is inserted from bottom to top and reaches the preset position, its larger second end 420 tightly abuts against the entry edge of the through hole 321, preventing further inward movement. This effectively avoids issues such as internal structural interference, excessive pressure on the lamp bead connection section 100*a*, or uneven fixation that may arise from over-insertion of the fastening plug 400, ensuring the reliability and consistency of the connection and fixation.

In other embodiments (not shown), the fastening plug 400 may also adopt a conical frustum structure, where the diameter of the first end 410 is smaller than that of the second end 420, and the outer peripheral surface forms a circular, gradually expanding cone. This frustum structure similarly creates a gap between the fastening plug 400 and the inner wall of the through hole 321 to accommodate the lamp bead connection section 100*a*, providing clearance for it. Moreover, the fastening plug 400 is made of an elastic material, undergoing elastic deformation upon insertion to enhance friction with the inner wall of the through hole 321. During assembly, the fastening plug 400 is inserted into the through hole 321 from the bottom surface of the lamp cover 320 through the first end 410. The conical outer peripheral surface cooperates with the inner wall of the through hole to narrow the gap, applying radial compressive force to the lamp bead connection section 100*a* to achieve locking. Its axial height is likewise not greater than the depth of the through hole 321, and the maximum dimension of the end face at the second end (i.e., the diameter of the circular end face) is greater than or equal to the opening diameter of the through hole 321, meeting requirements for appearance integrity and assembly stop, and adapting to installation needs in different scenarios.

Furthermore, the height of the fastening plug 400 in its axial direction is not greater than the depth of the through hole. This dimensional relationship ensures that when the fastening plug 400 completes the compressive fixation of the lamp bead connection section 100*a* and is installed in place, its top, i.e., the first end 410, does not protrude beyond the outer top surface of the lamp cover 320. This maintains the smooth and complete appearance of the top of the lamp shell 300, avoids potential bumps or snags, and enhances the product's safety and aesthetics. Meanwhile, the outer diameter of the second end of the fastening plug 400 is set to be greater than or equal to the opening diameter of the through hole. This design creates an effective physical stop during the assembly of the light string: when the fastening plug 400 is inserted from bottom to top and reaches the preset position, its larger-sized second end 420 abuts against the entry edge of the through hole 321, preventing further inward movement. This avoids issues such as internal structural interference, excessive pressure on the wire, or inconsistent fixation that may arise from over-insertion of the fastening plug, ensuring the reliability and consistency of the connection and fixation.

In other embodiments (not shown), to enhance the service life of the light string in outdoor or humid environments, a tighter sealing design is applied to the connection between the lamp body 310 and the fastening plug 400. Specifically, a rubber sealing ring or silicone gasket is used to seal the interface between the lamp body 310 and the fastening plug 400, effectively preventing moisture, dust, or other environmental contaminants from entering the interior cavity 315 of the lamp body 310. This significantly improves the waterproof and dustproof capabilities of the light string, ensuring stable operation under harsh environmental conditions and notably extending its service life.

In other embodiments (not shown), to improve the installation convenience and firmness of the fastening plug 400, sliding protrusions can be provided on the fastening plug 400, with corresponding sliding grooves set at the position on the lamp cover where the fastening plug 400 is installed. The sliding protrusions of the fastening plug 400 engage with the sliding grooves, allowing the fastening plug 400 to slide smoothly into place and be securely fixed, ensuring that the fastening plug 400 does not become misaligned or stuck during insertion. This design not only simplifies the installation process but also enhances the fixation between the fastening plug 400 and the lamp cover, ensuring the stability and reliability of the lamp bead connection section.

In other embodiments, depending on different lamp bead or wire specifications, the present disclosure provides replaceable fastening plugs 400 of varying sizes to adjust the compressive force of the fastening plug 400, ensuring that each lamp bead 200 and lamp bead connection section 100*a* is uniformly fixed, thereby enhancing the fixation effect. By replacing fastening plugs 400 of different sizes, the light string can flexibly adapt to the specification requirements of different lamp beads 200 and wires 100, improving its applicability and stability.

To further enhance the decorative appeal of the light string, the lamp shell 300 of the present disclosure can adopt designs in various shapes and colors. For example, the appearance of the lamp shell can be designed with multiple festive themes (such as Christmas, Halloween, Spring Festival, etc.) or specific artistic styles (such as retro, modern minimalist, etc.). Additionally, the outer surface of the lamp body 310 can be coated or use optical film materials, which can enhance the reflection or refraction effects of the light, creating richer halos and color effects, thereby improving visual aesthetics.

Compared to traditional light string designs, the installation process of the light string in this embodiment has been significantly simplified. Users can secure a light point in just three steps: first, the lamp bead connection section 100*a* with the lamp bead 200 is bent; then, it is threaded from the top of the lamp cover 320 through the through hole 321; finally, the fastening plug 400 is inserted from the bottom of the lamp cover 320 into the through hole 321 and pressed tight. The entire process requires no threaded fastening or snap-fit assembly, nor any specialized tools, greatly reducing the skill requirements for operators and operational complexity. This intuitive, rapid assembly method not only shortens the installation time per node but also makes large-scale construction or DIY home installation feasible, thereby substantially improving overall installation efficiency.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A decorative light string with a lamp shell, comprising:

at least one segment of continuous uninterrupted wire;

a lamp bead being electrically connected to the at least one segment of the continuous uninterrupted wire to form a lamp bead connection section;

the lamp shell, comprising a lamp body and a lamp cover, the lamp body forming an interior cavity for accommodating the lamp bead, the lamp cover being disposed on a top of the lamp body and provided with a through hole, the at least one segment of the wire of the lamp bead passing through the through hole and extending into the interior cavity, wherein the lamp shell further comprises a light-transmitting part, with a light-emitting surface of the lamp bead facing the light-transmitting part of the lamp shell, allowing light emitted by the lamp bead to evenly disperse through the light-transmitting part; and a fastening plug inserted into the through hole of the lamp cover, securing the lamp bead connection section against an inner wall of the through hole through compression;

wherein the fastening plug has a conical structure that gradually expands axially from a first end to a second end, wherein a size of the first end is smaller than a size of the second end, the fastening plug is configured for the first end to be inserted into the through hole from one side of the lamp cover after the lamp bead connection section is threaded through the through hole, and the fastening plug exerts a radial compressive force on the lamp bead connection section through cooperation between a conical outer peripheral surface of the fastening plug and the inner wall of the through hole, thereby fixing the lamp bead connection section within the through hole of the lamp cover, wherein a gap is defined between a side-wall surface of the fastening plug and an inner wall surface of the through hole, to allow the lamp bead connection section to pass through, wherein the fastening plug is made of an elastic material so that the conical outer peripheral surface undergoes elastic deformation when inserted into the through hole, to enhance friction with the inner wall surface of the through hole.

2. The decorative light string with a lamp shell according to claim 1, wherein the lamp body comprises an upper casing and a lower casing, with the upper casing and the lower casing adapted to snap together through a connecting flange and a recess provided at a connecting edge.

3. The decorative light string with a lamp shell according to claim 1, wherein a mounting connector is formed at a top end of the lamp body, and the lamp cover is nested and fixed onto the mounting connector.

4. The decorative light string with a lamp shell according to claim 3, wherein a limiting structure is formed at a joint between the lamp cover and the lamp body, and the limiting structure is configured to ensure stable alignment when the lamp cover is connected to the lamp body, preventing loosening between the lamp cover and the lamp body.

5. The decorative light string with a lamp shell according to claim 4, wherein the limiting structure comprises a positioning protrusion provided on the lamp body and a positioning groove provided on the lamp cover, the positioning protrusion being adapted to the positioning groove.

6. The decorative light string with a lamp shell according to claim 4, wherein the limiting structure comprises a limiting rib provided on an outer side wall of the mounting connector, and an inner wall of the lamp cover abuts against the limiting rib to restrict movement of the lamp cover along an axial direction of the mounting connector.

7. The decorative light string with a lamp shell according to claim 1, wherein a wall surface of the interior cavity of the lamp body is provided with an optical texture, the optical texture is configured to reflect and/or diffuse light emitted by the lamp bead, to improve uniformity and decorative effect of the light.

8. The decorative light string with a lamp shell according to claim 1 wherein a height of the fastening plug along an axial direction thereof is not greater than a depth of the through hole, so that after the fastening plug installs and fixes the lamp bead connection section, the first end thereof does not protrude beyond a top end of the lamp cover.

9. The decorative light string with a lamp shell according to claim 8, wherein a maximum dimension of an end face of the second end is greater than or equal to a diameter of the through hole, thereby forming a constraint on an axial position of the fastening plug.

* * * * *